Jan. 31, 1956 R. C. IMM 2,733,339

ELECTRICAL OSCILLATION GENERATORS

Filed June 6, 1952

Inventor - Ronald Charles Imm

By - Morris Kirschstein
Attorney

United States Patent Office 2,733,339

Patented Jan. 31, 1956

2,733,339

ELECTRICAL OSCILLATION GENERATORS

Ronald Charles Imm, Wembley, England, assignor to The General Electric Company Limited, London, England Application June 6, 1952, Serial No. 292,021

Claims priority, application Great Britain June 8, 1951

9 Claims. (Cl. 250—36)

Figures 1, 2:
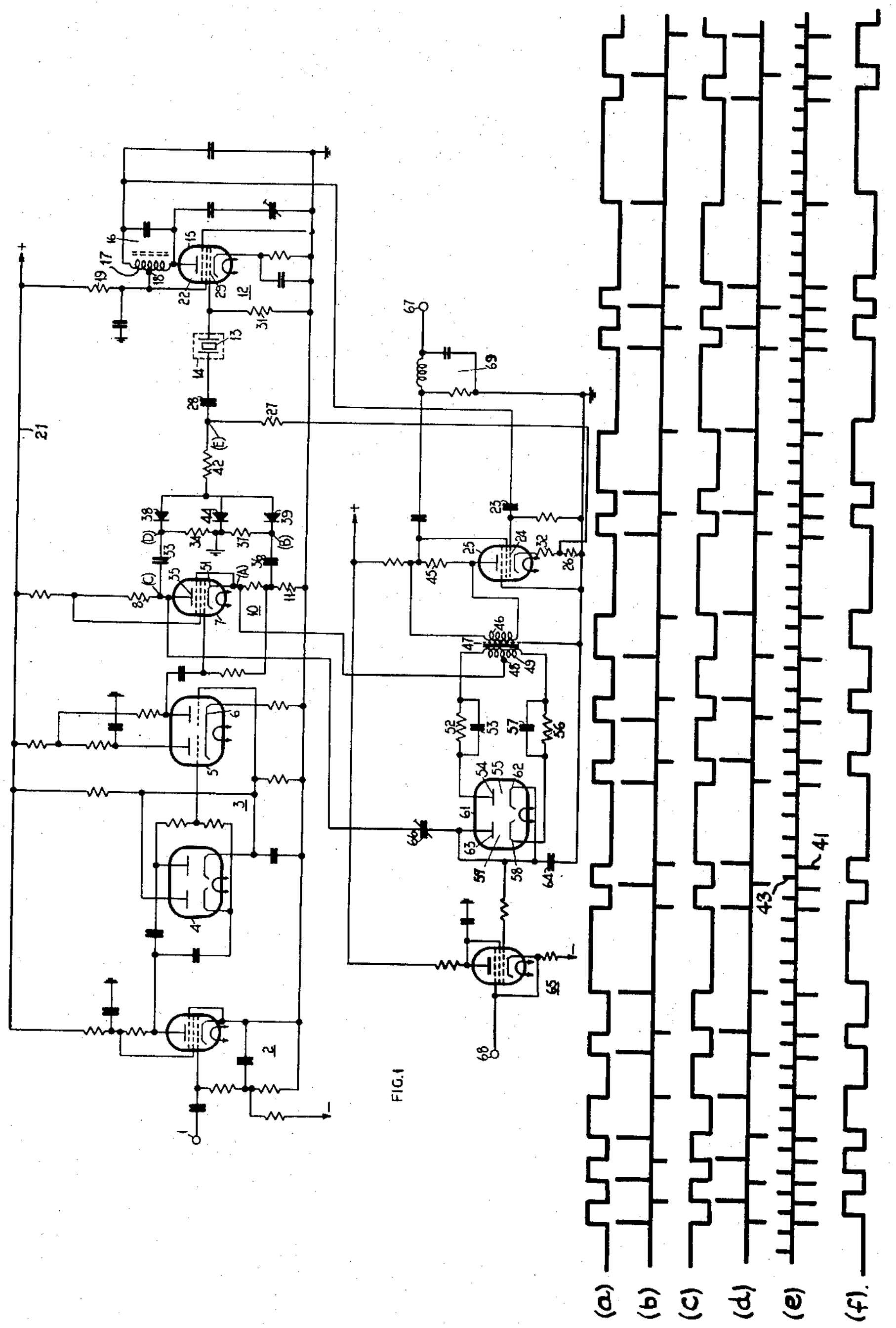

This invention relates to electrical oscillation generators and is more particularly concerned with generators of the kind which are adapted to be phase locked by a pulse signal.

In signalling systems which utilise pulse code modulation, the waveform of the transmitted signal may suffer appreciable distortion during transmission, for example due to the addition of "noise," and it is known to provide apparatus at the receiving terminal of the system for reshaping the waveform of the pulse signal. In a system which uses binary coding, the intelligence is transmitted by a signal having either one of two values at each of a succession of pulse intervals into which the pulse code signal may be divided. These two levels may for example be "pulse" and "no pulse" and the pulse reshaping apparatus at the receiving terminal of the system may include a gating device to which the received pulse code signal is applied, this gating device being responsive to the level of the pulse signal at instants which occur regularly at approximately the centre of each pulse interval so as to provide a pulse signal which carries the intelligence of the transmitted signal and which consists of pulses each lasting for a predetermined time. In order to operate this device, it is necessary to supply a gating signal thereto and it will be appreciated that, for correct operation of the gating device, this gating signal must be locked in phase to the pulse code signal. For this purpose it is usual to provide an oscillation generator from which is derived the gating signal, this generator being phase locked by the received pulse code signal.

According to the present invention, in an electrical oscillation generator of the kind which is adapted to be phase locked by a synchronising pulse signal, an oscillator valve has a positive feed-back path which contains means to derive from the output of the oscillator valve a feed-back signal consisting of unidirectional pulses while means to which is arranged to be supplied the synchronising pulse signal is adapted to supply a phasing signal consisting of unidirectional pulses which are arranged to be produced in dependence upon the leading and/or trailing edges of the waveform of the synchronising signal and which are each dependent upon one such edge, and there is means to add the said phasing signal to the said feed-back signal being supplied over the feed-back path, the pulses of the phasing signal being of the opposite sense to those of the feed-back signal and both being of relatively short duration compared with the pulses of the synchronising signal.

The generator will tend to operate so that the pulses of the phasing signal lie mid-way in time between the pulses of the feed-back signal and, when that occurs, the generator is phase locked by the synchronising signal. Clearly it is necessary for there to be sufficient pulses in the phasing signal to pull the generator into phase and it is therefore desirable that those pulses shall be produced by both the leading and trailing edges of the synchronising signal waveform.

The generator may be crystal controlled although that is not essential. A further valve which is arranged to operate under class C conditions may be provided in the feed-back path of the oscillator valve so that the amplitude of the pulses of the feed-back signal is substantially independent of the output of the oscillator valve.

An oscillation generator in accordance with the present invention may form part of a pulse reshaping apparatus, there being a gating device which is adapted to gate the synchronising signal by means of a gating signal derived from the said generator.

One arrangement of apparatus for reshaping a pulse code signal and which includes an oscillation generator in accordance with the present invention will now be described by way of example with reference to the two figures of the accompanying drawings. In the drawings, Figure 1 shows the circuit diagram of the apparatus while Figure 2 shows six waveforms marked (*a*) to (*f*) which are of typical voltages developed at the points (A) to (F) respectively in Figure 1 when a pulse code signal is supplied to the apparatus.

The pulse reshaping apparatus is adapted to deal with pulse code signals which may be considered to be made up of a plurality of equal time intervals in each of which there may or may not be a pulse, these intervals occurring at a frequency of 420 kilocycles per second. The duration of each of these pulses is approximately equal to the time interval so that if pulses occur at two or more adjacent time intervals, the effect is to produce a single pulse of increased duration.

The signal to be reshaped is supplied to a terminal 1 and is then passed through an amplifier stage 2 to a pulse slicing arrangement 3. This pulse slicing arrangement 3 is described more fully in the specification of co-pending United States patent application No. 291,765, filed June 4, 1952, and comprises a double diode valve 4, which is arranged to determine the level at which slicing is to be effected, followed by a double triode valve 5 which has a single cathode 6 and which is arranged as a voltage slicer. The resulting signal is supplied to a pentode valve 7 which forms part of a phase splitting stage 10, one pulse signal being developed across an anode load resistor 8 while another signal which is in anti-phase with the first mentioned signal is taken from across a resistor 11 in the cathode circuit of the valve 7. The resistors 8 and 11 are such that the said two pulse signals developed across those resistors are of approximately equal magnitude.

It is required to gate the pulse signal passed by the voltage slicer 3 and for this purpose there is provided an oscillator 12 which is controlled by the pulse code signal, as hereinafter described, to operate exactly at the fundamental frequency of the pulse code signal which is 420 kilocycles per second with a tolerance of plus or minus five parts in a million. The necessary gating signal is derived from the oscillator 12 which is crystal controlled and has its crystal 13 in a thermostatically controlled oven 14. The oscillator 12 comprises a pentode valve 15 which is arranged as a high gain amplifier with a parallel tuned circuit 16 as its anode load. This circuit 16 is tuned to 420 kilocycles per second and the coil 17 which forms one of the reactive elements of that circuit has a tapping 18 which is connected through a decoupling resistor 19 to a positive supply line 21 while one side of the coil 17 is connected to the valve anode 22. The side of the tuned circuit 16 remote from the anode 22 is connected through a condenser 23 to the control grid 24 of a pentode valve 25. The signal developed across a resistor 26 in the cathode circuit of the valve 25 is applied to the circuit formed by a resistor 27, a condenser 28, the crystal 13, and a resistor 31 connected in series. The crystal 13 is adapted to operate in a series resonant condition at 420 kilocycles per second and the voltage developed across the resistor 31 is fed to the control grid 29 of the valve 15, the resistor 31 having a resistance of 1,000 ohms which is of the same order as the series impedance of the crystal 13 at resonance.

Considering now the operation of the oscillator 12 in the absence of any synchronising signal, it will be appreciated that the signal fed to the grid 29 of the valve 15 is an oscillatory signal of the correct phase for the oscillator 12 to be maintained in oscillation. The valve 25 in the feed-back path is arranged to operate under class C conditions so that the output thereof is in the form of positive-going pulses of relatively short duration, the amplitude of the signal fed back to the oscillator valve 15 being therefore almost independent of the amplitude of the signal fed through the condenser 23. The resistor 26 across which is developed the signal which is fed back to the oscillator valve 15 has a very low resistance, for example 6–8 ohms and another resistor 32 of higher resistance is also provided in the cathode circuit of the valve 25 so as to self-bias that valve when there is no signal being supplied to it.

The said two signals passed by the phase splitting stage 10 are both arranged to be differentiated and for this purpose a differentiating circuit is formed by a condenser 33 and a resistor 34 connected between the anode 35 of the valve 7 and earth while a similar differentiating circuit formed by a condenser 36 and a resistor 37 is supplied from across the resistor 11. As shown in Figure 2, the two signals passed by these differentiating circuits consist of pulses, one positive-going and one negative-going, upon the occurrence of each leading edge and each trailing edge of the waveform of the pulse signal passed by the voltage slicer 3. The signals developed across the resistors 34 and 37 (see the waveforms shown in Figures 2(*b*) and 2(*d*)) are applied to two rectifiers 38 and 39, which may be diode valves, and the signals passed thereby are combined. These rectifiers 38 and 39 are arranged to suppress the positive-going pulses and the combined signal thus consists of unidirectional negative-going pulses 41 (see Figure 2(*e*)) which are each produced upon the occurrence of a leading or a trailing edge of the original pulse code signal (which has the waveform of Figure 2(*a*)) and are of relatively short duration compared with the applied pulses. This combined signal is fed as a phasing signal through a resistor 42 to the junction of the resistor 27 and the condenser 28 in the feed-back path of the oscillator valve 15, the two resistors 27 and 42 having the same resistance. Owing to the irregular nature of the pulses passed by the voltage slicer 3 and the variable duration of those pulses, it will be appreciated that the pulses of this combined signal passed by the rectifiers 38 and 39 do not occur regularly although they may occur at the same frequency as the pulses of the feed-back signal supplied by the valve 25.

These two sets of pulses, namely the feed-back signal supplied by the valve 25 and the phasing signal passed by the rectifiers 38 and 39, are opposite in sense and the pulses of the phasing signal affect the phase of operation of the oscillator 12 over a considerable number of cycles so that each pulse 41 of the phasing signal lies mid-way between successive pulses 43 supplied by the valve 25 as shown in Figure 2(*e*). The oscillator 12 is thus phase locked by the pulse code signal to be reshaped.

The condenser 28 may be variable for the purpose of adjusting the natural frequency of the oscillator 12.

A further rectifier 44 is provided between the junction of the two previously mentioned rectifiers 38 and 39 and earth so as to prevent any coupling of the signal passed by the valve 25 into the pulse code signal passed by the phase splitting stage 10 which would have the effect of degrading the pulse code signal.

A resistor 45 is connected in the anode circuit of the valve 25 and the primary winding 46 of a pulse transformer 47 is connected across this resistor 45. The center tapping 48 of the secondary winding 49 of this transformer 47 is connected to the cathode 51 of the valve 7 and one end of this winding 49 is connected through a resistor 52 in parallel with a condenser 53 to the anode 54 of a diode valve 55 while the other side is connected through a similar parallel-connected resistor 56 and condenser 57 to the cathode 58 of another diode valve 59. The diodes 55 and 59 are formed by a single double diode valve 61 and the remaining electrodes 62 and 63 of these two diodes 55 and 59 are connected together and to one side of a storage condenser 64, the other side of which is earthed.

The pulses passed by the valve 25 occur, when the oscillator 12 is phase locked, approximately in the middle of each time interval of the pulse code signal to be reshaped. Each of these pulses causes the two diodes 55 and 59 to be momentarily conducting thereby sampling the signal passed by the voltage slicer 3 at the middle approximately of each pulse interval. The sample level is stored by the storage condenser 64 until the occurrence of the next pulse passed by the valve 25 as seen in Figure 2(*b*). The signal produced across this condenser 64 is thus the required reshaped signal and this signal is then passed through a cathode follower stage 65. A variable condenser 66 is connected between the junction of this storage condenser 64 and the two diodes 55 and 59 and the anode 35 of the valve 7 for the purpose of compensating for the stray capacity of these diodes.

The signal passed by the valve 25 is also supplied to a resonant circuit 69 which is tuned to 420 kilocycles per second so as to provide a sinusoidal oscillation of that frequency from the terminal 67. This oscillation is utilised for phasing the decoding apparatus (not shown) to which is supplied the reshaped pulse code signal developed at the terminal 68.

I claim:

1. An electrical oscillation generator comprising a valve amplifier, an input path for supplying an input signal to the valve amplifier, means to derive from the output of the valve amplifier a feed-back signal consisting of unidirectional pulses and to supply these pulses to the input path so as to maintain the valve amplifier in oscillation, a path for supplying a synchronizing pulse signal, and means to derive a unidirectional pulse in dependence upon each predetermined edge of the waveform of the synchronizing signal and to supply this pulse to the said input path, the pulses supplied to the input path that are derived from the synchronizing signal being of the opposite sense to those derived from the output of the valve amplifier and both being of relatively short duration compared with the pulses of the synchronizing signal.

2. An electrical oscillation generator as set forth in claim 1 wherein the generator is crystal controlled.

3. An electrical oscillation generator as set forth in claim 1 wherein a piezo-electric crystal is connected in the said input path so as to control the operating frequency of the oscillation generator.

4. An electrical oscillation generator as set forth in claim 1 wherein the said means to derive a unidirectional pulse in dependence upon each predetermined edge of the waveform of the synchronizing signal is adapted to derive such a pulse in dependence upon each leading and each trailing edge of that waveform.

5. An electrical oscillation generator as set forth in claim 1 wherein the said means to derive a feed-back signal comprises a valve which is arranged to operate under class C conditions and a path for supplying to this valve the output from the said valve amplifier.

6. An electrical oscillation generator as set forth in claim 1 wherein the said means to derive a unidirectional pulse in dependence upon each predetermined edge of the waveform of the synchronizing signal comprises a phase-splitting stage which is adapted to derive two signals in anti-phase from the synchronizing pulse signal, two differentiating networks, two paths for supplying said two derived signals that are in anti-phase to the two differentiating networks respectively, two rectifier elements which are arranged to pass pulses of one sense supplied by the two differentiating networks respectively, and means to combine pulses passed by these two rectifier elements and to supply each of these pulses to the said input path.

7. An electrical oscillation generator comprising a valve amplifier, an input path for supplying an input signal to the valve amplifier, a valve arranged to operate under class C conditions, a path for supplying to this valve the output from the valve amplifier, a connection between the said valve arranged to operate under class C conditions and the input path so as to maintain the valve amplifier in oscillation by supplying a pulse from this valve to the input circuit as positive feed-back once during every oscillation cycle, a path for supplying a synchronizing pulse signal, a phase-splitting stage which is adapted to derive two signals in anti-phase from the synchronizing pulse signal, two differentiating networks, two paths for supplying said two derived signals that are in anti-phase to the two differentiating networks respectively, and two rectifier elements which are arranged to pass pulses in one sense supplied by the two differentiating networks respectively, and means to combine pulses passed by these two rectifier elements and to supply each of these pulses to the said input path, the pulses supplied to the input path that are derived from the synchronizing signal being of the opposite sense to those supplied by the valve arranged to operate under class C conditions and both being of relatively short duration compared with the pulses of the synchronizing signal.

8. An electrical oscillation generator as set forth in claim 7 wherein a piezo-electric crystal is connected in the said input path so as to control the operating frequency of the oscillation generator.

9. In pulse reshaping apparatus which comprises a pulse input path for supplying a pulse signal to be reshaped, an electrical oscillation generator, a gating device, means to supply to the gating device a gating signal derived from the oscillation generator so as to render the gating device conducting during a predetermined portion of each cycle of operation of the oscillation generator, and a path to supply to the gating device the pulse signal supplied over the pulse input path for the purpose of gating that signal at the instant when the gating device is rendered conducting, the electrical oscillation generator comprises a valve amplifier, an amplifier input path for supplying an input signal to the valve amplifier, means separate from said gating device to derive from the output of the valve amplifier a feedback signal consisting of unidirectional pulses and to supply these pulses to the amplifier input path so as to maintain the valve amplifier in oscillation, and means to derive a unidirectional pulse in dependence upon each predetermined edge of the waveform of a pulse signal supplied over the pulse input path and to supply each derived pulse to the amplifier input path.

References Cited in the file of this patent

UNITED STATES PATENTS

| | | |
|---|---|---|
| 2,540,167 | Houghton | Feb. 6, 1951 |
| 2,566,762 | English | Sept. 4, 1951 |
| 2,617,040 | Bailey | Nov. 4, 1952 |